(12) United States Patent
Nishimura et al.

(10) Patent No.: US 7,027,041 B2
(45) Date of Patent: Apr. 11, 2006

(54) PRESENTATION SYSTEM

(75) Inventors: Mitsuyoshi Nishimura, Saitama (JP);
Junichi Yokoyama, Saitama (JP);
Takashi Nagashima, Saitama (JP)

(73) Assignee: Fujinon Corporation, Saitama (JP)

( * ) Notice: Subject to any disclaimer, the term of this patent is extended or adjusted under 35 U.S.C. 154(b) by 312 days.

(21) Appl. No.: 10/254,508

(22) Filed: Sep. 26, 2002

(65) Prior Publication Data
US 2003/0063260 A1 Apr. 3, 2003

(30) Foreign Application Priority Data
Sep. 28, 2001 (JP) .............................. 2001-299262

(51) Int. Cl.
*G09G 5/00* (2006.01)
(52) U.S. Cl. ...................... 345/178; 345/156; 345/173; 345/179
(58) Field of Classification Search .................... 345/8, 345/156–180
See application file for complete search history.

(56) References Cited

U.S. PATENT DOCUMENTS

| 5,138,304 | A | * | 8/1992 | Bronson ...................... 345/157 |
| 5,495,269 | A | * | 2/1996 | Elrod et al. .................. 345/179 |
| 5,502,459 | A | * | 3/1996 | Marshall et al. ............. 345/158 |
| 5,504,501 | A | * | 4/1996 | Hauck et al. ................ 345/158 |
| 5,515,079 | A | * | 5/1996 | Hauck ......................... 345/157 |
| 5,528,263 | A | * | 6/1996 | Platzker et al. .............. 345/156 |
| 6,323,839 | B1 | * | 11/2001 | Fukuda et al. ............... 345/157 |
| 6,339,748 | B1 | * | 1/2002 | Hiramatsu .................... 345/156 |
| 6,346,929 | B1 | * | 2/2002 | Fukushima et al. ............. 345/8 |
| 6,353,428 | B1 | * | 3/2002 | Maggioni et al. ............ 345/157 |
| 6,512,507 | B1 | * | 1/2003 | Furihata et al. .............. 345/157 |
| 6,545,670 | B1 | * | 4/2003 | Pryor ........................... 345/173 |
| 6,704,000 | B1 | * | 3/2004 | Carpenter ..................... 345/158 |

FOREIGN PATENT DOCUMENTS

| JP | A 8-286147 | 11/1996 |
| JP | A 10-4228 | 1/1998 |
| JP | A 2000-321530 | 11/2000 |

* cited by examiner

*Primary Examiner*—Vijay Shankar
*Assistant Examiner*—David L. Lewis
(74) *Attorney, Agent, or Firm*—Oliff & Berridge PLC

(57) ABSTRACT

A presentation system comprises: a screen device; a projecting device for projecting an image onto the screen device; an indication mark for setting two reference points, which is two orthogonal points on a rectangular virtual screen, near a presenter and for the presenter operating a point on the virtual screen; a photographing device for photographing the virtual screen and the indication mark; and an arithmetic operation device for generating coordinates of the virtual screen from the two reference points photographed by the photographing device, and for calculating coordinates of the indication mark on the generated virtual screen. The projecting device projects a point image onto the coordinates of the indication mark on the image.

6 Claims, 2 Drawing Sheets

PRESENTATION SYSTEM

BACKGROUND OF THE INVENTION

1. Field of the Invention

The present invention relates to a presentation system for giving a presentation while indicating a point on a screen using a projector such as a liquid crystal projector. More particularly, the present invention relates to the development of a new pointer.

2. Description of the Related Art

When making a presentation for a lecture or the like using a liquid crystal projector, a laser pointer which indicates a point on a screen by projecting a laser beam is often used. A laser pointer of this type has, however, the following disadvantages. Shake greatly and adversely influences the pointing operation, thereby making the point unstable. A laser beam may be erroneously projected to be hazardously incident on the eyes of the audience. In addition, the shape of the point is limited to simple shapes such as a circle and a line, which cannot satisfy the demand for changing the shape of the point according to the user's preference.

To solve these disadvantages, various proposals have been conventionally made. For example, according to Japanese Patent Unexamined Application Publication No. 8-286147 (to be referred to as "Reference (1)" hereinafter), a rotating disk having a plurality of refracting grids for refracting a laser beam is rotated by a driving motor so that the laser beam is scanned by the refracting grids to enable the formation of a point into an arbitrary shape. In addition, the gyro effect of the rotation disk can reduce shaking. As safety measures, Japanese Patent Unexamined Application Publication No. 10-4228 (to be referred to as "Reference (2)" hereinafter) discloses that the projection of laser beam may be automatically turned on and off according to the brightness of a laser beam projection target (such as a screen) and that the laser beam is projected only if the brightness of the target exceeds a preset threshold value. Furthermore, Japanese Patent Unexamined Application Publication No. 2000-321530 (to be referred to as "Reference (3)" hereinafter) discloses a technique for detecting a vertical or horizontal angle and projecting laser beam only if the detected angle is within a predetermined range.

According to the laser pointer disclosed by Reference (1), the number of parts is relatively large, so that the weight of the laser pointer is increased and it is difficult to make the laser pointer small. Besides, since the laser pointer is forced to be operated while resisting moment which is generated by the rotation disk, it is not easily handled. Furthermore, although the shape of the point can be changed, it is difficult to increase variations in the shape of the point and to transform the laser beam into light of a complicated shape. According to the safety measures disclosed by References (2) and (3), if the laser point cannot be accurately operated, laser beam is projected. Due to this, these measures do not thoroughly ensure safety. That is, according to Reference (2), there is sometimes a location, other than the screen, having a brightness which exceeds the threshold value, depending on the lighting conditions of the place of a meeting or the like. If an audience member or the like is present at the location, laser beam may possibly be projected onto the audience member. According to Reference (3), an audience member is sometimes present within a laser beam projection angle, depending on the place of a meeting or the like such as a tiered seat or an upstairs seat. In this case, the laser beam may possibly be projected onto the audience member.

SUMMARY OF THE INVENTION

It is, therefore, an object of the present invention to provide a presentation system which can ensure safety, suppress shaking and generate complicated, diversified shapes of a point.

The present invention provides a presentation system comprising: a screen device; a projecting device for projecting an image onto the screen device; an indication mark for setting two reference points, which is two orthogonal points on a rectangular virtual screen, near a presenter and for the presenter operating a point on the virtual screen; a photographing device for photographing the virtual screen and the indication mark; and an arithmetic operation device for generating coordinates of the virtual screen from the two reference points photographed by the photographing device, and for calculating coordinates of the indication mark on the generated virtual screen. The projecting device projects a point image onto the coordinates of the indication mark on the image.

According to the present invention, the presenter first sets a rectangular virtual screen which corresponds to the screen device, in a space, for example, on the left or right of the presenter. The virtual screen is a two-dimensional space which has an X axis (a horizontal axis) and a Y axis (a vertical axis) in which the presenter virtually performs a pointing operation using the indication mark. If the virtual screen is set on the right of the presenter, the size and position of the virtual screen are basically set to fall within a range covered by the movement of the presenter's right arm.

If it is assumed that the virtual screen is set on the right of the presenter, the photographing device photographs the space on the right side of the presenter in which space the virtual screen is set (left side from the photographing device). To set the virtual screen, the presenter stops the indication mark, which is held by the presenter with the right hand or attached to the presenter, at a lower left position in the right-side space, allows the photographing device to photograph this position as the reference point A (X=0, Y=0) and to input the reference point A thus photographed into the arithmetic operation device. Next, the presenter extends the right arm to stop the indication mark at an upper right position in the right-side space, allows the photographing device to photograph this position as the reference point B (X=n, Y=m) and to input the reference point B into the arithmetic operation device. The reference point B is a corner point orthogonal to the reference point A. Based on an orthogonal line which connects these fixed reference points A and B, the arithmetic operation device generates the coordinates of the rectangular virtual screen. As a result, the virtual screen is set on the right side of the presenter and is always photographed by the photographing device.

If the virtual screen is set as described above, the presenter can perform a pointing operation to move the indication mark on the virtual screen. The position of the indication mark is continuously photographed by the photographing device and is input into the arithmetic operation device. The arithmetic operation device sequentially calculates the coordinates of the indication mark on the coordinates of the virtual screen. The projecting device projects a point image onto the coordinates of the indication mark. By doing so, the point image which corresponds to the position of the indication mark is projected onto the screen device. The presenter appropriately moves the indication mark and performs the pointing operation while viewing the point image projected onto the screen device.

According to the present invention, unlike a laser pointer, the presentation system is not constituted to project a point onto the screen device by the projection of laser beam. Due to this, the danger of the laser beam can be thoroughly eliminated and safety is thereby ensured. Furthermore, the coordinates of the virtual screen based on the reference points A and B photographed by the photographing device and those of the moving indication mark are obtained by a well-known image processing technique. It is possible to correct the shaking of the indication mark and to generate a point image of an arbitrary shape ranging from not only a circle and a line but also an arrow, a hand and the like. Consequently, it is possible to project a stable point image, for which the shaking is suppressed, onto the visible image and to transform the point image to an image of a complicated, diversified shape. Furthermore, since data on the image projected by the projecting device and on the point image can be easily delivered to a plurality of locations, it is possible to deal with a multiple screens which are equipped with a plurality of sets of projecting devices and screen devices.

Moreover, since the virtual screen thus set is fixed, the presenter can freely move relative to the virtual screen. Particularly by the movement of the presenter, it is possible to set a large moving range in the horizontal direction (X direction), which facilitates operating the point in the horizontal direction. Furthermore, if the presenter sets the horizontal distance between the reference points A and B to be larger than the length of the arm when setting the virtual screen, the resolution of the photographing device for the virtual screen is improved and the coordinates of the virtual screen operated by the arithmetic operation device can be set more finely. As a result, the follow-up performance of the indication mark is improved to make the movement of the point image smoother. According to the present invention, the following modes are added as preferred additional constituent elements.

First, the photographing device comprises an automatic angle change mechanism for automatically searching and photographing the reference point A so as to photograph the reference point A which is initially set in the two reference points A and B set by the indication mark. The photographing device changes an angle by panning or tilting to change the field of view of the photographing device. If this mechanism is provided, the photographing device can easily zoom in on the initially set reference point A within the field of view thereof and deal with a wide-range virtual screen.

Next, the photographing device comprises a zoom function. If the photographing device comprises the zoom function, it is possible to facilitate photographing the reference points A and B by setting the angle of field of the photographing device to be wide during the setting of the virtual screen, and it is thereby possible to deal with a wide-range virtual screen. If the virtual screen is set based on the reference points A and B, the angle of field is narrowed (the photographing device is zoomed in) and the photographing device can zoom in on the virtual screen within the field of view of the photographing device, whereby the resolution of the photographing device for the virtual screen is improved.

Furthermore, the photographing device comprises a lighting device for illuminating the presenter. According to this constitution, it is possible to appropriately display the figure of the presenter on the screen device and to thereby provide a more complete presentation.

Furthermore, the indication mark is produced by a light emitter. The indication mark held by the presenter with the hand or attached to the presenter may be arbitrarily selected as long as it can be identified from the other portion if the photographing device performs photographing. The indication mark is preferably a light emitter. The light emitter which emits invisible light such as infrared light is more preferable since the light cannot be seen by the audience.

DESCRIPTION OF THE PREFERRED EMBODIMENTS

One embodiment of the present invention will be described hereinafter with reference to the drawings.

Figure 1:
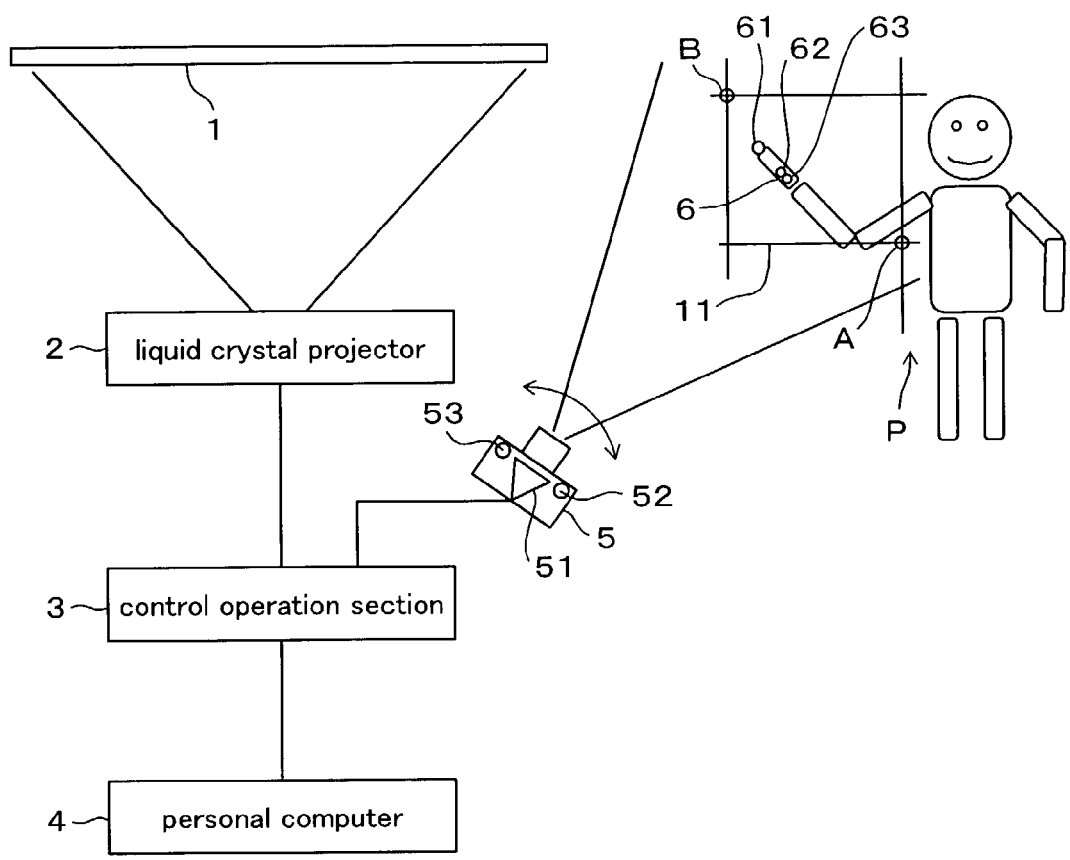
FIG. 1 is a schematic diagram of a presentation system in one embodiment according to the present invention.

FIG. 1 schematically shows an overall presentation system in one embodiment according to the present invention. In FIG. 1, reference symbol P denotes a presenter, 1 denotes a screen (screen device), 2 denotes a liquid crystal projector (projecting device) which projects a liquid crystal image onto the screen 1, 3 denotes a control arithmetic operation section (arithmetic operation device) and 4 denotes a personal computer. Data on the liquid crystal image is generated in the personal computer and the image data as well as various commands is input from the personal computer 4 into the control arithmetic operation section 3. The image data which has been processed by the control arithmetic operation section 3 is input into the liquid crystal projector 2, and an image based on the image data is projected, as a visible image, onto the screen 1 from the liquid crystal projector 2. Furthermore, in FIG. 1, reference symbol 5 denotes a camera (photographing device). This camera 5 is equipped with a spotlight (lighting device) 51. The camera 5 has a zoom function and an auto-focus function and also an angle change mechanism based on pan and tilt.

Figure 2:
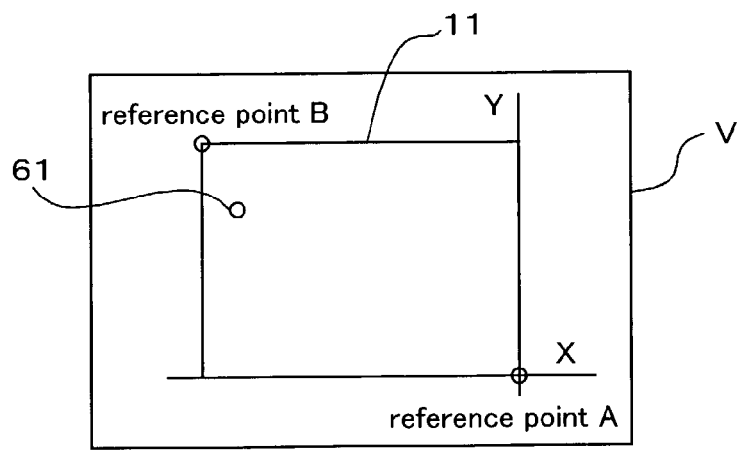
FIG. 2 shows the field of view of a camera in the embodiment according to the present invention.

The presenter P has a communication box 6 in the right hand. An infrared light emitting section (indication mark) 61 is provided on the tip end portion of this communication box 6. This light emission section 61 emits an infrared light for setting reference points A and B (to be described later in detail) so as to serve as the indicating mark. The presenter P sets a virtual screen 11 on the right of the presenter P based on a diagonal line which connects the reference points A and B. As shown in FIG. 2 as well as FIG. 1, this virtual screen 11 is a rectangular two-dimensional space which has an X-axis (a horizontal axis) and a Y-axis (a vertical axis) to virtually operate a point by the light emitting section 61 of the communication box 6. The virtual screen 11 is basically set to fall within a range which can be covered by the movement of the right arm of the presenter P.

The communication box 6 is equipped with a reference point setting switch 62 for setting the reference points A and B by allowing the light emitting section 61 to emit a light beam, and a pointer switch 63 used for pointing operation. If the reference point setting switch 62 is turned on, infrared light with a reference point setting wavelength is emitted from the light emitting section 61. If the pointer switch 63 is turned on, infrared light with a wavelength different from the reference point setting wavelength of the switch 62 is emitted from the light emitting section 61. The camera 5 is equipped with a light receiving section 51 which receives the respective infrared light, and a recognition display section 53 which consists of an LED or the like and which flickers to notify the presenter P that this light receiving section 52 is recognizing (photographing) the infrared light with the reference point setting wavelength. A recognition signal from the recognition display section 53 and an image picked up by the camera 5 are input into the control arithmetic operation section 3. Furthermore, the angle change mechanism of the camera 5 is controlled by the control arithmetic operation section 3 so as to automatically search the initially set reference point A using the light emitting section 61 and to locate the reference point A at a predetermined position within the field of view of the camera 5.

The communication box 6 is also equipped with an image change switch (not shown) to select the image data from the personal computer 4 or the image picked up by the camera 5 as an image to be projected from the light crystal projector 2 onto the screen 1. If this image change switch is turned on, then the spotlight 51 is turned on, infrared light with a wavelength different from those of infrared light which are emitted if the reference point setting switch 62 and the pointer switch 63 are turned on is emitted from the light emitting section 61, the emitted infrared light is received by the light receiving section 52 of the camera 5 and a light receiving signal is input into the control arithmetic operation section 3.

The control arithmetic operation section 3 generates XY coordinates of the virtual screen 11 based on the reference points A and B which are photographed by the camera 5, by an ordinary image analysis method. The position of the light emitting section 61 which is moving on the virtual screen 11 is always photographed by the camera 5, and input into the control arithmetic operation section 3. The control arithmetic operation section 3 sequentially calculates the coordinates of the light emitting section 61 on the coordinates of the virtual screen 11. The control arithmetic operation section 3 processes the image data from the personal computer 4 and the coordinate data from the light emitting section 61 and synthesizes a point image on the calculated coordinates of the light emitting section 61 on the image from the personal computer 4.

Figure 3:
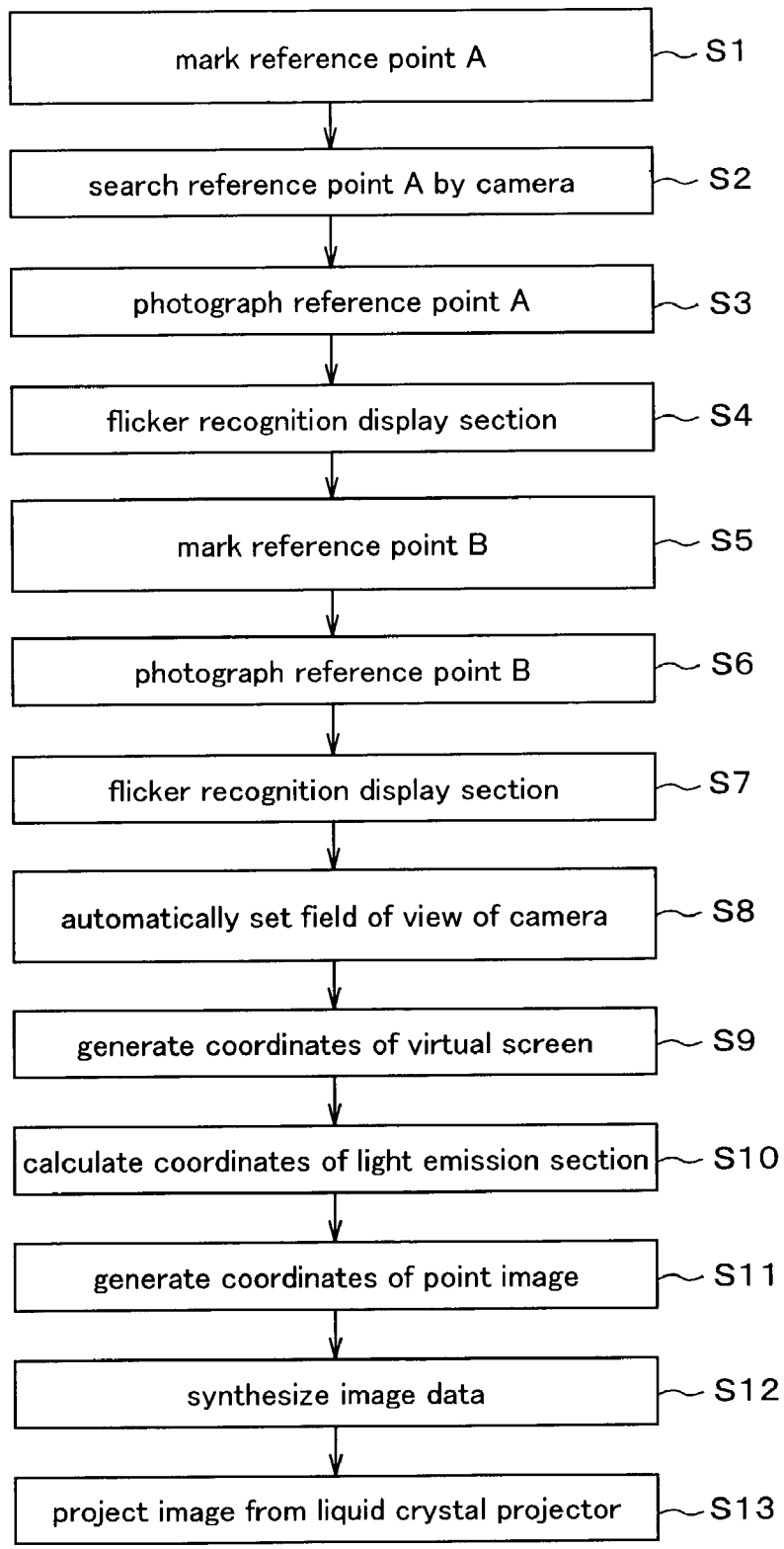
FIG. 3 is a flow chart showing the operations of the presentation system in the embodiment according to the present invention.

The operations of the presentation system will next be described with reference to the flow chart of FIG. 3.

(1) Setting of Virtual Screen

While photographing the direction of the presenter P with the camera 5 set to perform wide-angle photographing, the presenter P stops the communication box 6 held with the right hand at a lower left position in a right-side space, turns on the reference point setting switch 62 and marks the reference point A which is the position of the light emitting section 61 (in a step S1). The camera 5 automatically searches the light emitting section 61 while panning and changing a tilt angle according to need (in a step S2). If the camera 5 photographs the light emitting section 61 as the reference point A (in a step S3), the recognition display section 53 flickers (in a step S4). The position of the reference point A is input into the control arithmetic operation section 3.

Next, the reference point setting switch 62 is temporarily turned off, the presenter P extends the right arm to stop the light emitting section 61 of the communication box 6 at an upper right position in the right-side space, turns on the reference point setting switch 62, and marks the reference point B which is a corner point orthogonal to the reference point A (in a step S5). If the camera 5 photographs the light emitting section 61 as the reference point B (in a step S6), the recognition display section 53 flickers (in a step S7). The position of the reference point B is input into the control arithmetic operation section 3.

Thereafter, the camera 5 automatically zooms in and, if necessary, pans and tilts, thereby zooming in on a virtual screen 11 which is set based on an orthogonal line which connects the reference points A and B within the field of view of the camera 5 (in a step S8). FIG. 2 shows the field of view V of the camera 5 in this state. Although the presenter P is also within this field of view V, this is not shown in FIG. 2. Next, the control arithmetic operation section 3 generates XY coordinates of the rectangular virtual screen 11 shown in FIG. 2 based on the orthogonal line which connects the fixed reference points A and B photographed by the camera 5 (in a step S9). The fixed virtual screen 11 is thus set on the right side of the presenter P and is always photographed by the camera 5.

(2) Presenter P's Pointing Operation

While turning on the pointer switch 63 of the communication box 6, the presenter P performs a pointing operation to move the light emitting section 61 on the virtual screen 11. The position of the light emitting section 61 is continuously photographed by the camera 5 and is input into the control arithmetic operation section 3, and the control arithmetic operation section 3 calculates the coordinates of the light emitting section 61 on the coordinates of the virtual screen 11 (in a step S10). Furthermore, the control arithmetic operation section 3 transforms the coordinates of the light emitting section 61 to those on the screen 1 and generates coordinates of a point image (in a step S11).

On the other hand, the personal computer 4 outputs image data to the control arithmetic operation section 3. This image data is one which does not include the point image to be projected onto the screen 1. The control arithmetic operation section 3 synthesizes a predetermined point image at the position of the coordinates of the point image in the image (in a step S12). The image data is thus generated. This image data is output to the liquid crystal projector 2 and the liquid crystal projector 2 projects the image obtained by synthesizing the point image with the image from the personal computer 4 (in a step S13). As a result, the point image is projected at a point on the screen 1 which corresponds to the position of the light emitting section 61 on the virtual screen 11. The presenter P appropriately moves the light emitting section 61 of the communication box 6 and performs the pointing operation while viewing the point image projected onto the screen 1.

One embodiment according to the present invention has been described so far. According to this embodiment, unlike in a system using a laser pointer, the presentation system is not constituted to project a point onto the screen by the projection of a laser beam. The danger of the laser beam can thereby be thoroughly eliminated and safety is therefore ensured. Furthermore, the coordinates of the virtual screen 11 based on the reference points A and B photographed by the camera 5 and those of the moving light emitting section 61 are obtained by the image processing technique. It is, therefore, possible to correct the shaking of the light emitting section 61 and to generate a point image of an arbitrary shape ranging from not only a circle and a line but also an arrow, a hand and the like by the process using the image processing technique. Consequently, it is possible to project a stable point image, for which the shaking is suppressed, onto the screen 1 and to transform the point image to an image of a complicated, diversified shape.

Moreover, since the virtual screen 11 thus set is fixed, the presenter P can freely move relative to the virtual screen 11. Particularly by the movement of the presenter P, it is possible to set a large moving range in the horizontal direction (X direction), which facilitates operating the point in the horizontal direction. Furthermore, when setting the virtual screen 11, the presenter P can set the horizontal distance between the reference points A and B to be larger than the length of the arm. By so setting, the resolution of the camera 5 for the virtual screen 11 is improved and the coordinates of the virtual screen 11 operated by the control arithmetic operation section 3 can be set more finely. As a result, the follow-up performance of the light emitting section 61 is improved to make the movement of the point image smoother.

Additionally, the camera 5 automatically searches the reference point A so as to photograph the reference point A to be initially set and then photographs it. It is, therefore, possible to easily zoom in on the reference point A within the field of view of the camera 5 and to deal with a wide-range virtual screen 11. In addition, since the camera 5 has a zoom function, it is possible to facilitate photographing of the reference points A and B by setting the angle of field of the photographing device to be wide during the setting of the virtual screen 11, and it is thereby possible to deal with a wide-range virtual screen 11. In addition, by allowing the camera 5 to zoom in on the virtual screen 11 within the field of view of the camera 5 during the setting of the virtual screen 11, the resolution of the camera 5 for the virtual screen 11 is improved.

In the above-stated embodiment, the presenter P can project the image of the presenter P onto the screen 1 by operating the image change switch while making a presentation. Alternatively, by redirecting the camera 5 toward the audience, a questioner selected from the audience, for example, can perform the same pointing operation as the presenter P. By doing so, it is possible to provide a more complete presentation. If the camera 5 is redirected, the X-axis on the coordinates of the virtual screen 11 are inverted and it is, therefore, necessary to correct the inversion.

Furthermore, since data on the image projected by the liquid crystal projector 2 and on the point image can be easily delivered to a plurality of locations, it is possible to deal with a multiple screens which are equipped with a plurality of sets of screens 1 and liquid crystal projectors 2.

What is claimed is:

1. A presentation system comprising:
   a screen device that displays an image;
   an indication mark for setting a virtual screen near a user and for being used by the user to operate a point on the virtual screen;
   a photographing device that photographs the virtual screen and the indication mark;
   an arithmetic operation device that calculates coordinates of the indication mark on the virtual screen based on a photographed image of the virtual screen and the indication mark photographed by the photographing device; and
   a projecting device for projecting a point image onto the screen device, based on the calculated coordinates of the indication mark on the virtual screen, which are calculated by the arithmetic operation device;
   wherein when the user sets two arbitrary reference points by using the indication mark, the photographing device photographs the two reference points and the arithmetic operation device generates coordinates of the virtual screen from a photographed image of the two reference points photographed by the photographing device, so that the virtual screen is set to have a rectangular area based on the two arbitrary reference points.

2. A presentation system according to claim 1, wherein the photographing device comprises an automatic angle change mechanism that automatically searches and photographs each of the two reference points so as to photograph each reference point initially set at the time the two reference points were set by the indication mark.

3. A presentation system according to claim 1, wherein the photographing device comprises a zoom function.

4. A presentation system according to claim 1, wherein the photographing device comprises a lighting device that illuminates the user, an image of the illuminated user being projected to the screen device according to operation.

5. A presentation system according to claims 1, wherein the indication mark is produced by a light emitter.

6. A presentation system comprising:
   a screen device capable of displaying an image;
   a coordinate space spatially distinct from the screen device;
   an indication mark that specifies a point within the coordinate space;
   a photographing device that creates a photographic image of the coordinate space;
   an arithmetic operation device that calculates coordinates of a point within the coordinate space based on the photographed image of the coordinate space and the indication mark; and
   a projecting device that projects a point image onto the screen device based on the calculated coordinates of the indication mark within the coordinate space;
   wherein the indication mark is used to identify reference points within the coordinate space which are photographed by the photographing unit, the output of the photographing unit providing input to the arithmetic operating device to generate coordinates defining a rectangularly bounded coordinate space based on the identified reference points.

* * * * *